United States Patent
Fukui (10) Patent No.: US 11,651,143 B2
(45) Date of Patent: May 16, 2023

(54) INFORMATION PROCESSING APPARATUS, SYSTEM, INFORMATION PROCESSING METHOD, AND COMPUTER-READABLE STORAGE MEDIUM FOR STORING PROGRAMS

(71) Applicant: CANON KABUSHIKI KAISHA, Tokyo (JP)

(72) Inventor: Masayuki Fukui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/386,284

(22) Filed: Jul. 27, 2021

(65) Prior Publication Data

US 2022/0043962 A1 Feb. 10, 2022

(30) Foreign Application Priority Data

Aug. 4, 2020 (JP) .............................. JP2020-132540

(51) Int. Cl.
| | | |
|---|---|---|
| *G06F 17/10* | (2006.01) | |
| *G06F 40/14* | (2020.01) | |
| *G06F 40/134* | (2020.01) | |
| *G06F 16/955* | (2019.01) | |

(52) U.S. Cl.
CPC .......... *G06F 40/14* (2020.01); *G06F 16/9566* (2019.01); *G06F 40/134* (2020.01)

(58) Field of Classification Search
CPC ..... G06F 40/14; G06F 40/134; G06F 16/9566
See application file for complete search history.

(56) References Cited

U.S. PATENT DOCUMENTS

| | | | | |
|---|---|---|---|---|
| 5,918,214 A * | 6/1999 | Perkowski | ............. | G06Q 30/02 |
| | | | | 379/93.12 |
| 6,058,373 A * | 5/2000 | Blinn | ................. | G06Q 30/0635 |
| | | | | 705/28 |
| 6,125,353 A * | 9/2000 | Yagasaki | ................. | H04L 67/75 |
| | | | | 705/26.62 |
| 6,154,738 A * | 11/2000 | Call | ..................... | G06Q 20/208 |
| | | | | 715/239 |
| 7,257,819 B1 * | 8/2007 | Dixon, III | ............... | G06F 9/542 |
| | | | | 719/330 |
| 8,060,414 B1 * | 11/2011 | Lin | ..................... | G06Q 30/0601 |
| | | | | 705/26.1 |
| 8,121,970 B1 * | 2/2012 | Tung | ..................... | G06F 16/958 |
| | | | | 706/45 |
| 8,307,073 B1 * | 11/2012 | Brundage | ........... | G06F 11/0793 |
| | | | | 709/224 |
| 10,360,589 B1 * | 7/2019 | Channappa | ........ | G06Q 30/0251 |

(Continued)

FOREIGN PATENT DOCUMENTS

| | | | |
|---|---|---|---|
| JP | 2001-503542 A | | 3/2001 |
| KR | 20160070282 A | * | 6/2016 |
| WO | 98/19259 A1 | | 5/1998 |

*Primary Examiner* — Shahid K Khan
(74) *Attorney, Agent, or Firm* — Venable LLP (57) ABSTRACT

An access to a URL that includes predetermined information is received, and derivative information based on the predetermined information included in the received URL is acquired. A Web page in which the acquired derivative information is described is generated, and the generated Web page is transmitted to a source of the access to the URL. The predetermined information and the derivative information include product information.

11 Claims, 8 Drawing Sheets

(56) References Cited

U.S. PATENT DOCUMENTS

| | | | |
|---|---|---|---|
| 10,614,500 B2* | 4/2020 | Pan | G06Q 30/0625 |
| 2001/0030234 A1* | 10/2001 | Wiklof | H03L 7/081 |
| | | | 235/383 |
| 2002/0007322 A1* | 1/2002 | Stromberg | G06Q 30/06 |
| | | | 705/26.1 |
| 2002/0161745 A1* | 10/2002 | Call | H04L 61/4511 |
| 2002/0198777 A1* | 12/2002 | Yuasa | G06Q 30/02 |
| | | | 705/14.36 |
| 2003/0144868 A1* | 7/2003 | MacIntyre | G06Q 10/063 |
| | | | 707/999.107 |
| 2004/0103043 A1* | 5/2004 | Reade | G06Q 30/0623 |
| | | | 705/23 |
| 2008/0004986 A1* | 1/2008 | Choe | G06Q 30/0641 |
| | | | 705/26.7 |
| 2008/0263023 A1* | 10/2008 | Vailaya | G06F 16/334 |
| | | | 707/999.005 |
| 2008/0270561 A1* | 10/2008 | Tang | G06Q 30/02 |
| | | | 709/207 |
| 2009/0228357 A1* | 9/2009 | Turakhia | G06Q 30/02 |
| | | | 726/5 |
| 2010/0023412 A1* | 1/2010 | Kitagawa | G06Q 30/0601 |
| | | | 705/26.1 |
| 2010/0121735 A1* | 5/2010 | Shimooka | G06Q 30/02 |
| | | | 705/26.1 |
| 2011/0010470 A1* | 1/2011 | Hulbert | G06F 13/4282 |
| | | | 710/63 |
| 2011/0264560 A1* | 10/2011 | Griffiths | G06Q 30/0641 |
| | | | 705/27.1 |
| 2011/0290871 A1* | 12/2011 | Jon | G06F 16/23 |
| | | | 235/375 |
| 2012/0179556 A1* | 7/2012 | Ertas | G06Q 20/14 |
| | | | 705/14.73 |
| 2012/0259882 A1* | 10/2012 | Thakur | G06F 16/9535 |
| | | | 707/E17.074 |
| 2013/0066959 A1* | 3/2013 | Brundage | G06F 11/0793 |
| | | | 709/203 |
| 2013/0085894 A1* | 4/2013 | Chan | G06Q 30/02 |
| | | | 705/26.62 |
| 2013/0144834 A1* | 6/2013 | Lloyd | G06F 16/955 |
| | | | 707/E17.001 |
| 2013/0262464 A1* | 10/2013 | Klane | G06F 16/22 |
| | | | 707/736 |
| 2014/0281882 A1* | 9/2014 | Scoda | G06F 16/958 |
| | | | 715/234 |
| 2018/0150869 A1* | 5/2018 | Finnegan | G06Q 30/0239 |
| 2019/0121831 A1* | 4/2019 | Travieso | G06F 16/958 |
| 2020/0233919 A1* | 7/2020 | Howe | G06F 16/9014 |
| 2021/0326370 A1* | 10/2021 | Cui | G06F 16/3344 |

\* cited by examiner

INFORMATION PROCESSING APPARATUS, SYSTEM, INFORMATION PROCESSING METHOD, AND COMPUTER-READABLE STORAGE MEDIUM FOR STORING PROGRAMS

BACKGROUND

Field

The present disclosure relates to an information processing apparatus for generating a Web page, a system, an information processing method, and a computer-readable storage medium for storing programs.

Description of the Related Art

There are cases where a user views information related to a specific product via the Internet. For example, the user acquires information of the product that the user themself wants to view by accessing a Web page related to the product on a Web site. The user, when selecting a name of the product on a Web site, by selecting a product name (hereinafter, referred to as a general-purpose product name) that collectively refers to a plurality of similar product names, can refer to a Web page on which information that is common between a plurality of products is posted. The following is known as a configuration for displaying a Web page for acquiring information related to products with respect to a general-purpose product name, which collectively refers to one or more product names.

In Japanese Patent Laid-Open No. 2001-503542, when a user inputs a general-purpose product number into an input form provided on a Web site, the Web site displays a URL (Uniform Resource Locator) that is associated with that general-purpose product number. It is described that the user then refers to specific product information from there.

SUMMARY

The present disclosure provides an information processing apparatus for improving convenience in providing derivative information to a user, a system, and an information processing method, and a computer-readable storage medium for storing programs.

The present disclosure in one aspect provides an information processing apparatus comprising: a reception unit configured to receive an access to a URL that includes predetermined information; an acquisition unit configured to acquire derivative information based on the predetermined information included in the URL to which the access has been received from the reception unit; a generation unit configured to generate a Web page in which the derivative information acquired by the acquisition unit is described; and a transmission unit configured to transmit, to a source of the access to the URL, the Web page generated by the generation unit, wherein the predetermined information and the derivative information include product information.

According to the present disclosure, it is possible to improve convenience in providing derivative information to a user.

Further features of the present disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In Japanese Patent Laid-Open No. 2001-503542, the user first accesses a Web page and then inputs into the Web page a general-purpose product name. Then, the user refers to specific product information via a displayed, associated URL.

However, there is a further demand for improvement in convenience in the process of the user referring to derivative information related to a product.

Figure 1:
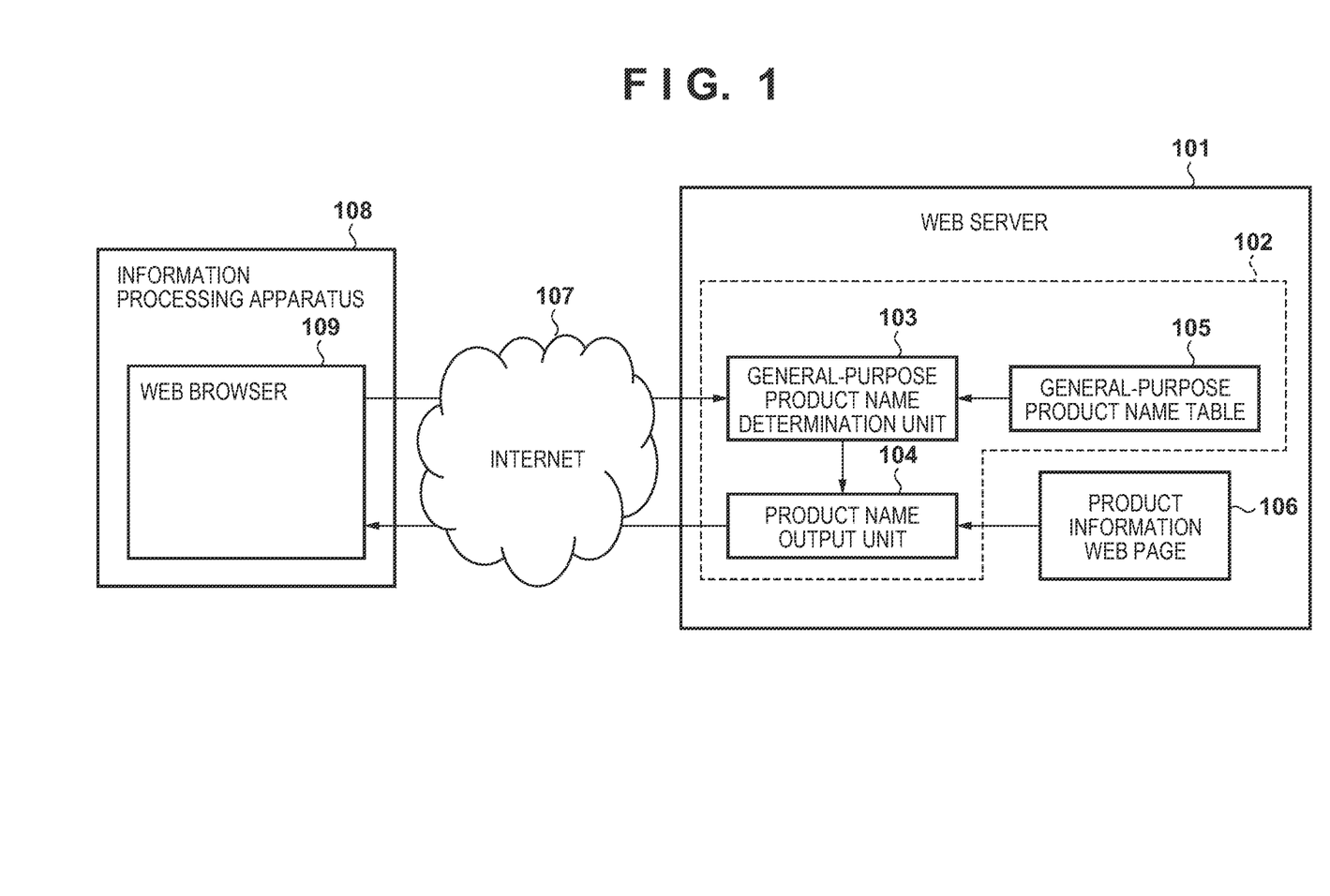
FIG. 1 is a view illustrating a configuration of a Web page display system.

FIG. 1 is a view illustrating a configuration of a Web page display system in the present embodiment. As illustrated in FIG. 1, the Web page display system is configured to include an information processing apparatus 108 and an information processing apparatus 101. In the present embodiment, the information processing apparatus 101 is a Web server and, hereinafter, will be described as a Web server 101. The information processing apparatus 108 is, for example, a portable terminal such as a PC (Personal Computer), a smartphone, or a tablet. The information processing apparatus 108 can communicate with the Internet 107 and can access the external Web server 101 by designating a URL (Uniform Resource Locator) via a Web browser 109.

Figure 9:
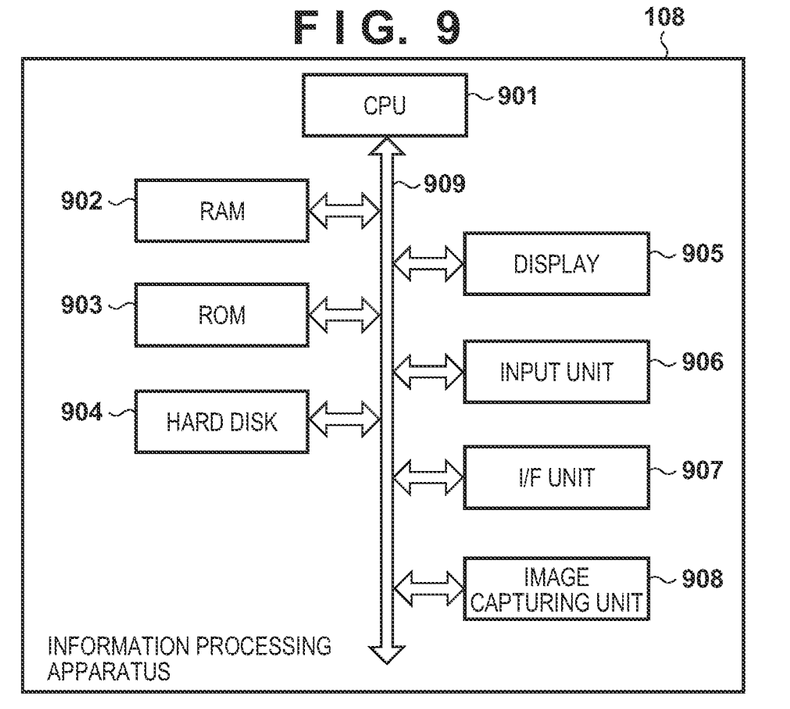
FIG. 9 is a view illustrating a hardware configuration of an information processing apparatus.

A hardware configuration of each of the apparatuses, the information processing apparatus 108 and the Web server 101, will be described. FIG. 9 is a view illustrating an example of a hardware configuration of the information processing apparatus 108. The information processing apparatus 108 has functional blocks of a typical information processing apparatus. A CPU 901, by performing computation, determination, and control for data and commands in accordance with programs stored in a RAM 902, a ROM 903, or a hard disk 904, comprehensively controls the information processing apparatus 108. The RAM 902 is used as, for example, a temporary storage region for when the CPU 901 performs various kinds of processing. The hard disk 904 stores an operating system (OS), application software, and the like. Operation of the information processing apparatus 108 in the present embodiment is realized by, for example, the CPU 901 loading to the RAM 902 a program stored in the ROM 903 and executing it.

A display 905 includes a liquid crystal display and a graphics controller. The CPU 901 performs display on the display 905 based on externally-acquired or internally-held display data. For example, the CPU 901 performs display of objects such as images and icons typified by shortcut menus and launchers or display of various kinds of user interface screens such as a GUI.

An input unit 906 can accept various kinds of operations for the information processing apparatus 108 by the user and is, for example, a pointing device and a keyboard. Also, in an interface (I/F) unit 907, a wireless LAN or a wired LAN that is compatible with a standard such as IEEE 802.11a is used, and it is possible to transmit and receive data to and from a device on the same network or the Internet using a protocol such as TCP/IP. An image capturing unit 908 is, for example, a smartphone or notebook type PC camera. Each block of FIG. 9 performs data transmission and reception with each other via a system bus 909.

Note that in FIG. 9, the information processing apparatus 108 indicates a case of a so-called notebook type PC in which the display 905 and the input unit 906 are integrated with a control unit, which includes the CPU 901, the RAM 902, and the like. However, the information processing apparatus 108 is not limited to the configuration of FIG. 9 and may be of a so-called desktop type in which the display 905 and the input unit 906 are separate bodies or a so-called tablet terminal which uses a touch sensor as a pointing device.

Figure 10:
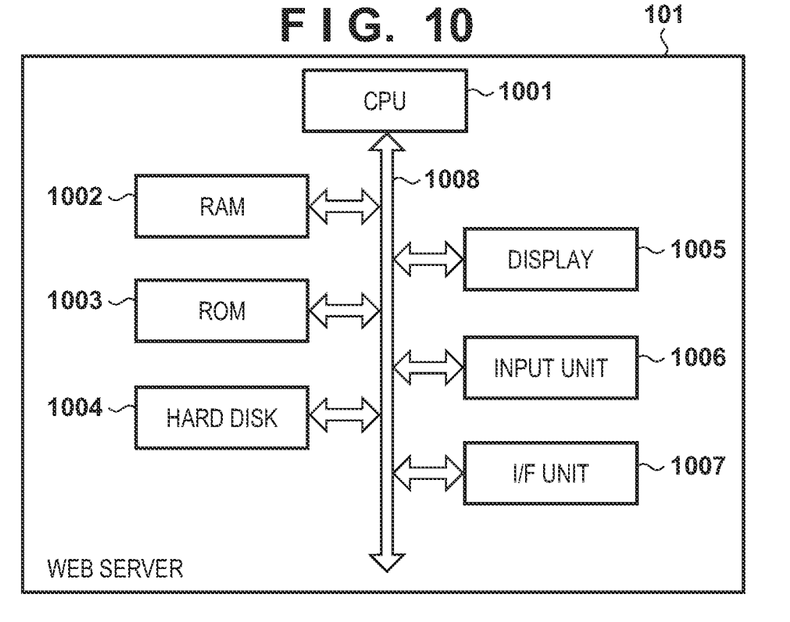
FIG. 10 is a view illustrating a hardware configuration of a Web server.

FIG. 10 is a view illustrating an example of a hardware configuration of the Web server 101. A CPU 1001, by performing computation, determination, and control for data and commands in accordance with programs stored in a RAM 1002, a ROM 1003, or a hard disk 1004, comprehensively controls the Web server 101. The RAM 1002 is used as, for example, a temporary storage region for when the CPU 1001 performs various kinds of processing. The hard disk 1004 stores an operating system (OS), application software, and the like. Operation of the Web server 101 in the present embodiment is realized by, for example, the CPU 1001 loading to the RAM 1002 a program stored in the ROM 1003 and executing it.

A display 1005 includes a liquid crystal display and a graphics controller. The CPU 1001 performs display on the display 1005 based on display data. For example, the CPU 1001 performs display of objects such as images and icons typified by shortcut menus and launchers or display of various kinds of user interface screens such as a GUI. An input unit 1006 can accept various kinds of operations for the Web server 101 by the user and is, for example, a pointing device and a keyboard. Also, in an interface (I/F) unit 1007, a wireless LAN or a wired LAN that is compatible with a standard such as IEEE 802.11a is used, and it is possible to transmit and receive data to and from a device on the same network or the Internet using a protocol such as TCP/IP. Each block of FIG. 10 performs data transmission and reception with each other via a system bus 1008.

The hard disk 1004 stores a Web page creation program for creating a product information Web page upon reception of an access to a URL of a product information Web page from the Web browser 109 of the information processing apparatus 108. Also, in the hard disk 1004, for example, a database and a table for managing product information are configured. Note that the above Web page creation program generates a product information Web page by receiving an access to a URL via the Web browser 109 of the information processing apparatus 108.

FIG. 1 is referred to again. In the information processing apparatus 108, the Web browser 109 is included. The Web browser 109 is an application program for displaying Web content provided from the Web server 101 via the Internet 107. The user can view Web content provided from the Web server 101 by the Web browser 109.

In the present embodiment, an example of a case where the user acquires a product information Web page related to a printer from the Web server 101 via the Web browser 109 of the information processing apparatus 108 will be described. In FIG. 1, one unit is illustrated for each of the information processing apparatus 108 and the Web server 101; however, each apparatus may be of a plurality. Also, the Web server 101 may be configured such that the functional blocks illustrated in FIG. 1 is realized by a single apparatus or a plurality of apparatuses. Note that there are cases where the Web server 101 is realized by a plurality of apparatuses and hence is called a Web server system. Also, the system of FIG. 1 may also include other apparatuses such as a printer, an access point, and a router. Also, instead of the Internet 107, configuration may be of another network such as a WAN.

The Web server 101 provides Web content to the information processing apparatus 108 via the Internet 107. In the Web server 101, a product information Web page 106 to be provided to the information processing apparatus 108 and a product name display system 102 are included. The product information Web page 106 and the product name display system 102 are, for example, programs stored in a storage region such as the ROM 1003 and the hard disk 1004 of the Web server 101, and each module of FIG. 1 is realized via execution by the CPU 1001. Also, the product information Web page 106 and the product name display system 102 may be a different program from the above Web page creation program or may include at least a part of it.

The product name display system 102 includes a general-purpose product name determination unit 103, a product name output unit 104, and a general-purpose product name table 105. The product name display system 102 provides the product information Web page 106 to the Web browser 109 of the information processing apparatus 108.

The general-purpose product name determination unit 103 receives from an external unit an access to a product name inclusive URL 302 (to be described later) that the user designated. Then, the general-purpose product name determination unit 103, by referring to the general-purpose product name table 105, determines whether or not a product name included in the product name inclusive URL 302 is a general-purpose product name. In a case where it is determined that a product name is a general-purpose product name, the general-purpose product name determination unit 103 decides that the product name is a general-purpose product name and, in addition to the general-purpose product name, outputs one or more derivative product names that derives from the general-purpose product name. Derivative product names are, for example, a series of product model numbers that have been serialized with a general-purpose product name as the collective name. Meanwhile, in a case where it is determined that a product name is not a general-purpose product name, the general-purpose product name determination unit 103 decides that the product name is not a general-purpose product name and outputs the product name as is. The general-purpose product name table 105 is information in which a general-purpose product name and one or more derivative product names corresponding to that are defined and is, for example, stored in a storage region of the hard disk 1004 or the like as a table, in a table form.

The product name output unit 104 describes on the product information Web page 106 a product name or a general-purpose product name and one or more derivative product names that the general-purpose product name determination unit 103 outputted. In a case where a general-purpose product name and one or more derivative product names are outputted from the general-purpose product name determination unit 103, the product name output unit 104 describes both the general-purpose product name and the derivative product name on the product information Web page 106. Meanwhile, in a case where a product name is not a general-purpose product name and only the product name is outputted from the general-purpose product name determination unit 103, the product name output unit 104 describes that product name on the product information Web page 106. In such a case, neither a general-purpose product name nor a derivative product name will be described on the product information Web page 106.

The product information Web page 106 is a Web page that includes a product name outputted from the general-purpose product name determination unit 103. The product information Web page 106 is created for each target product. Also, in a case where all or most of the information to be posted on a Web page is the same between a plurality of products, the plurality of product names are grouped as a general-purpose product name and the same Web page is created. For example, there are cases where only an outer shape or color of a product is different and content is the same for product information. In such cases, the product information Web page 106 is created for each group described above.

As illustrated in FIG. 1, the general-purpose product name determination unit 103 and the product name output unit 104 are configured inside the Web server 101. However, another configuration may be employed. For example, each function of the general-purpose product name determination unit 103 and the product name output unit 104 may be configured to be included in the product information Web page 106. In a case of such a configuration, each process of the general-purpose product name determination unit 103 and the product name output unit 104 is executed on the Web browser 109 of the information processing apparatus 108.

Figure 2:
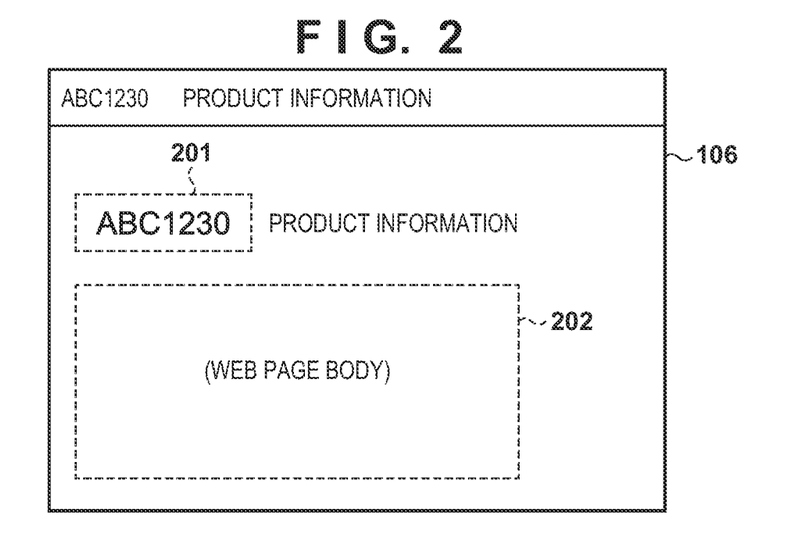
FIG. 2 is a view illustrating configuration elements of content included in a product information Web page.

FIG. 2 is a view illustrating an example of configuration elements of content included in the product information Web page 106. The product information Web page 106 is displayed by the user designating a URL by the Web browser 109. The product information Web page 106 includes a product name display area 201 and a Web page body display area 202. In the product name display area 201, a product name of the product information that the user is trying to view is described. Arranging this product name display area 201 makes it possible to make the user confirm that the Web page that the user themself is trying to view is related to a product name of a desired product. The Web page body display area 202 is an area in which specific product information of the product information Web page 106 will be described. In the Web page body display area 202, for example, product information is described in formats such as text, image, and video.

Figure 3:
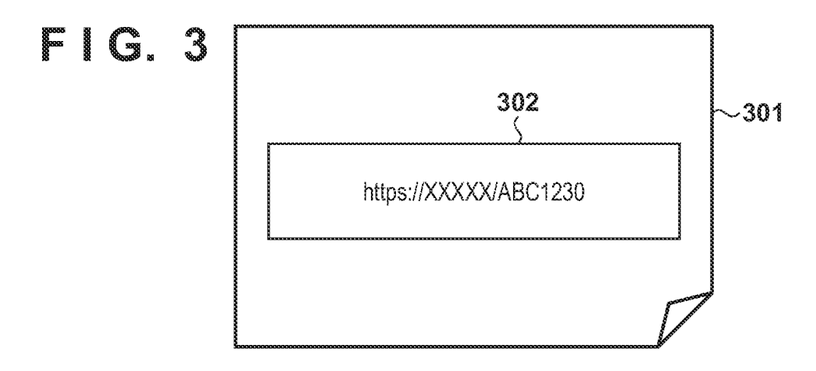
FIG. 3 is a view illustrating an external medium.

FIG. 3 is a view illustrating an example of an external medium used for the user to refer to Web content of the product information Web page 106. An external medium 301 is a medium on which the product name inclusive URL 302 is described and may be made of, for example, paper, sticker, plastic, and the like. The external medium 301 may be attached to, for example, a product and the like or may be attached to a pamphlet distributed at a store and the like. For example, the external medium 301 is attached to a pamphlet provided with a printer that the user has purchased.

The product name inclusive URL 302 is a URL for referring to the product information Web page 106. In the present embodiment, a product name is appended to a predetermined position of the product name inclusive URL 302. For example, a product name, "ABC1230", is appended to the end of the product name inclusive URL 302 of FIG. 3. Other than a product name, an arbitrary text string that serves as an alternative to a product name may be appended to the product name inclusive URL 302. Also, in the external medium 301, information other than the product name inclusive URL 302 may be included. For example, information that the creator of the external medium 301 wants to provide such as illustration representing the product, introductory note for the product, a usage method of the product, and the like may be included.

By the external medium 301, the user can easily access the product information Web page 106. For example, the user, by inputting the product name inclusive URL 302 via the input unit 906 of the information processing apparatus 108, can view on the display 905 the product information Web page 106 that corresponds to a product name appended to the product name inclusive URL 302. Note that the product name inclusive URL 302 may be described in a text string or may be described in a two-dimensional barcode or the like. In a case where description is made in a two-dimensional barcode, for example, the user, by capturing the two-dimensional barcode by a camera of a smartphone that is the information processing apparatus 108, can easily access the product information Web page 106 of the product name inclusive URL.

In a case of creating the external medium 301 for each a product name and in a case where there is many product names, it is necessary to create a large number of product name inclusive URLs 302. As a result, management of product name inclusive URLs becomes complex. Furthermore, it is also necessary to create a large amount of external media 301 of different types; accordingly, cost for creating the external media 301 increases. In the present embodiment, a plurality of similar product names are grouped as a specific general-purpose product name, and at a predetermined position of a URL for accessing the product information Web page 106, that specific general-purpose product name is appended. This makes it possible to reduce the burden of managing product name inclusive URLs and prevent cost of creating the external media 301 from increasing.

Figure 4:
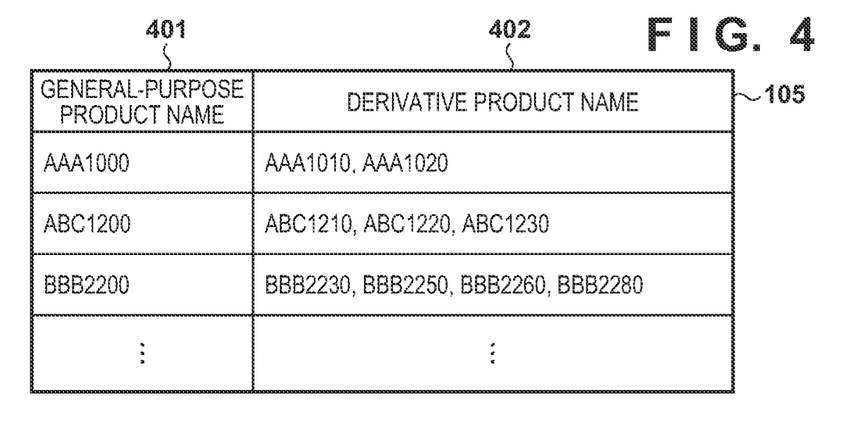
FIG. 4 is a view illustrating a general-purpose product name table.

FIG. 4 is a view illustrating an example of a configuration of the general-purpose product name table 105. The general-purpose product name table 105 is configured to include two columns, a general-purpose product name column 401 and a derivative product name column 402. The general-purpose product name column 401 is a column in which general-purpose product names are described to be identifiable. The derivative product name column 402 is a column in which one or more derivative product names (derivative information), which belongs to a general-purpose product name described in the general-purpose product name column 401, is described. In each row of the general-purpose product name table 105, the general-purpose product name is described in the general-purpose product name column 401 and one or more derivative product names that belong to the general-purpose product name is described in the derivative product name column 402. For example, as illustrated in FIG. 4, "AAA1010, AAA1020" are described in the derivative product name column 402 in correspondence to "AAA1000" of the general-purpose product name column 401. This indicates that there is a general-purpose product name, "AAA1000", and that in a case where this is included in the product name inclusive URL 302, derivative product names, "AAA1010" and "AAA1020", correspond to the general-purpose product name.

Regarding the general-purpose product name table 105, a pair of a general-purpose product name and a derivative product name derived therefrom are described by, for example, a Web page creator. Also, configuration may also be taken such that a pair of a general-purpose product name and a derivative product name is set for all product names that the product information Web page 106 targets. Note that configuration may also be taken such that in a case where, for example, a derivative product name does not exist for a certain general-purpose product name, the same product name is described in the general-purpose product name column 401 and the derivative product name column 402. In the derivative product name column 402 of the general-purpose product name table 105, only a product name is described as derivative information related to a product; however, another information may be described. For example, a text string that represents a particular element such as a product function or application software may be described as derivative information in addition to a product name.

Figure 5:
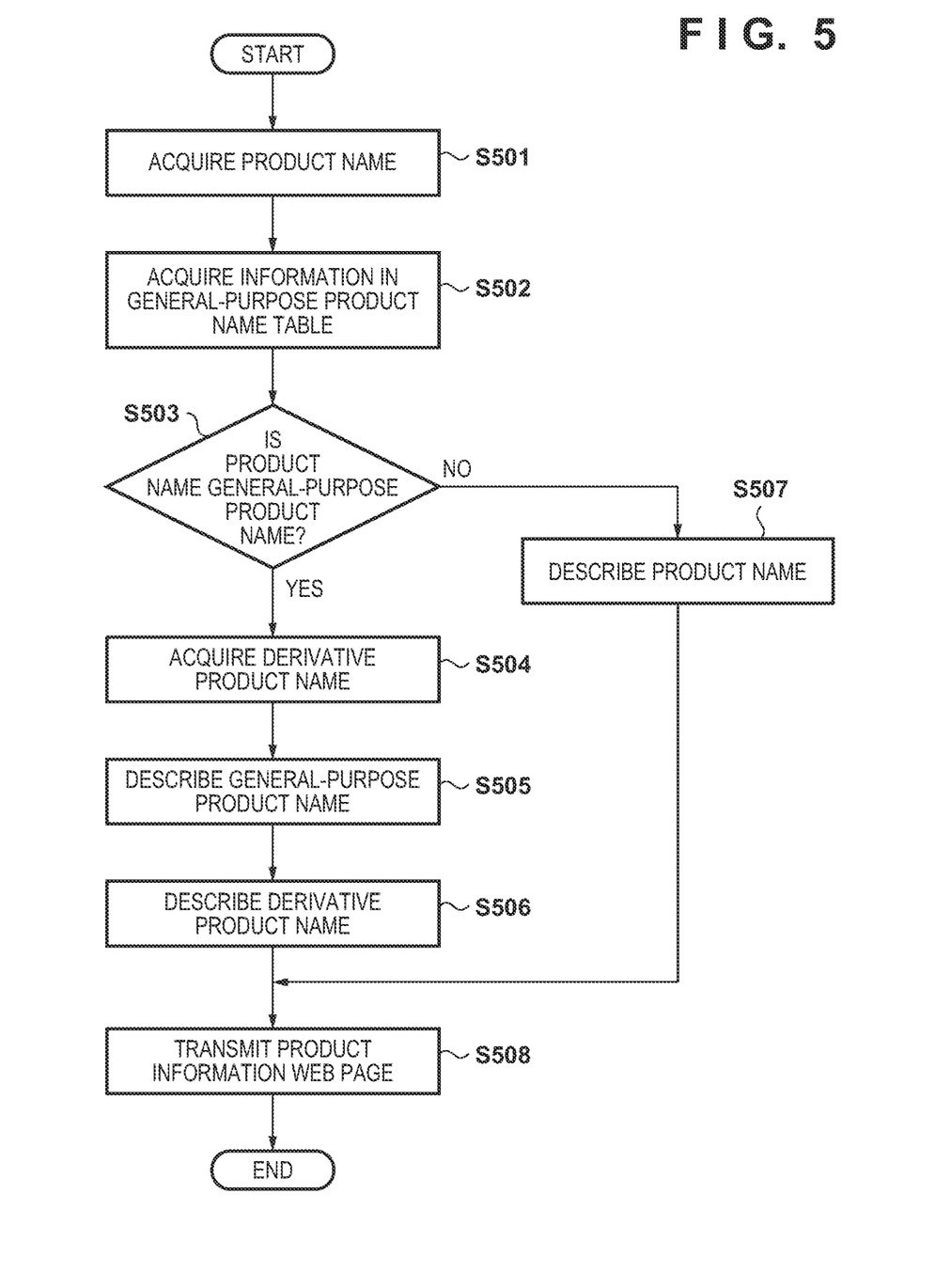
FIG. 5 is a flowchart illustrating processing of a product name display system.

FIG. 5 is a flowchart illustrating processing of the product name display system 102. The processing of FIG. 5 is realized by, for example, the CPU 1001 reading out to the RAM 1002 a program stored in the ROM 1003 and executing it. The processing of FIG. 5 is started when the Web server 101 receives an access to the product name inclusive URL 302 via the Internet 107 from the information processing apparatus 108.

The general-purpose product name determination unit 103 acquires a product name from a predetermined position of the product name inclusive URL 302 for which an access has been received (step S501). For example, in a case where the product name inclusive URL 302 is "http://XXXX/ABC1230", "ABC1230" is acquired as a product name appended to the product name inclusive URL 302. The position of a product name may be predetermined, such as at the end of a URL.

The general-purpose product name determination unit 103 acquires information of the general-purpose product name table 105. In other words, the general-purpose product name determination unit 103 acquires a list of the general-purpose product name column 401 and the derivative product name column 402 (step S502). The general-purpose product name determination unit 103 determines whether or not the product name acquired in step S501 is a general-purpose product name (step S503). Regarding the determination in step S503, the general-purpose product name column 401 included in the general-purpose product name table 105 acquired in step S502 is referred to and determination is made based on whether or not the product name acquired in step S501 exists in the general-purpose product name column 401. In a case where it is determined that the product name acquired in step S501 is a general-purpose product name, the general-purpose product name determination unit 103 decides that the product name acquired in step S501 is a general-purpose product name.

In the present embodiment, it is determined that a product name is a general-purpose product name on the basis that the product name acquired in step S501 exists in the general-purpose product name column 401. However, another standard may be used as a condition for that determination. For example, configuration may also be taken such that a column, in which a flag that indicates that a product name is a general-purpose product name is described, is arranged in addition to the general-purpose product name column 401. In such a case, it is determined that a product name is a general-purpose product name in a case where a flag is set in that column. For example, in a case where a pair of a general-purpose product name and a derivative product name are set for all product names that the product information Web page 106 targets as in the above-described configuration, configuration may be taken so as to arrange the aforementioned column for a flag.

When it is decided that the product name acquired in step S501 is a general-purpose product name, the general-purpose product name determination unit 103 acquires from the derivative product name column 402 of the general-purpose product name table 105 one or more derivative product names that correspond to the general-purpose product name (step S504). Then, the general-purpose product name determination unit 103 transfers the one or more derivative product names to the product name output unit 104.

The product name output unit 104 acquires the product information Web page 106 and then describes the product information decided as a general-purpose product name in the product name display area 201 of the product information Web page 106 (step S505). Note that the product information Web page 106 prior to description may be generated in advance or generated in step S505. Then, the product name output unit 104 describes all of one or more derivative product names acquired in step S504 in a derivative product name display area 601 (to be described later) (step S506). Note that the processing in step S505 and S506 may be the following processing. For example, the product information Web page 106 in which a general-purpose product name and a Web page body are already described may be managed on the Web server 101. A description will be given using an example of the product information Web page 106 of FIG. 6. The product information Web page 106 in which ABC1200 is described in the product name display area 201, information of ABC1200 is described in the Web page body, and the derivative product name display area 601 is blank is managed on the Web server 101. Then, in a case where it is determined that a product name is a general-purpose product name in step S503, the product information Web page 106 that corresponds to the determined general-purpose product name is read out. Then, the product name output unit 104 may describe the derivative product name acquired in step S504 in the derivative product name display area 601. In other words, description processing in step S505 may be replaced with an acquisition of the product information Web page 106 that corresponds to a general-purpose product name.

Step S503 is referred to again. In step S503, in a case where it is determined that the product name acquired in step S501 is not a general-purpose product name, the general-purpose product name determination unit 103 transfers to the product name output unit 104 the product name appended to a predetermined position of the product name inclusive URL 302. Then, the product name output unit 104 acquires the product information Web page 106 and then describes the product name in the product name display area 201 (step S507). Note that the product information Web page 106 prior to description may be generated in advance or generated in step S507. Note that the processing in step S507 may be the following processing. For example, the product information Web page 106 (e.g., the product information Web page 106 of FIG. 7) on which a derivative product name is already described may be managed on the Web server 101. Then, in a case where it is determined that a product name is not a general-purpose product name (i.e., is a derivative product name) in step S503, the product information Web page 106 in which a derivative product name is described may be acquired as a result by reading out the product information Web page 106 that corresponds to the determined derivative product name.

The product name output unit 104 transmits the product information Web page 106 generated in step S506 or S507 to the information processing apparatus 108, which is a source of access to the URL of the product information Web page 106, via the Internet 107 (step S508). In the information processing apparatus 108, the product information Web page 106 on which each product name is described is displayed by the Web browser 109.

Figure 6:
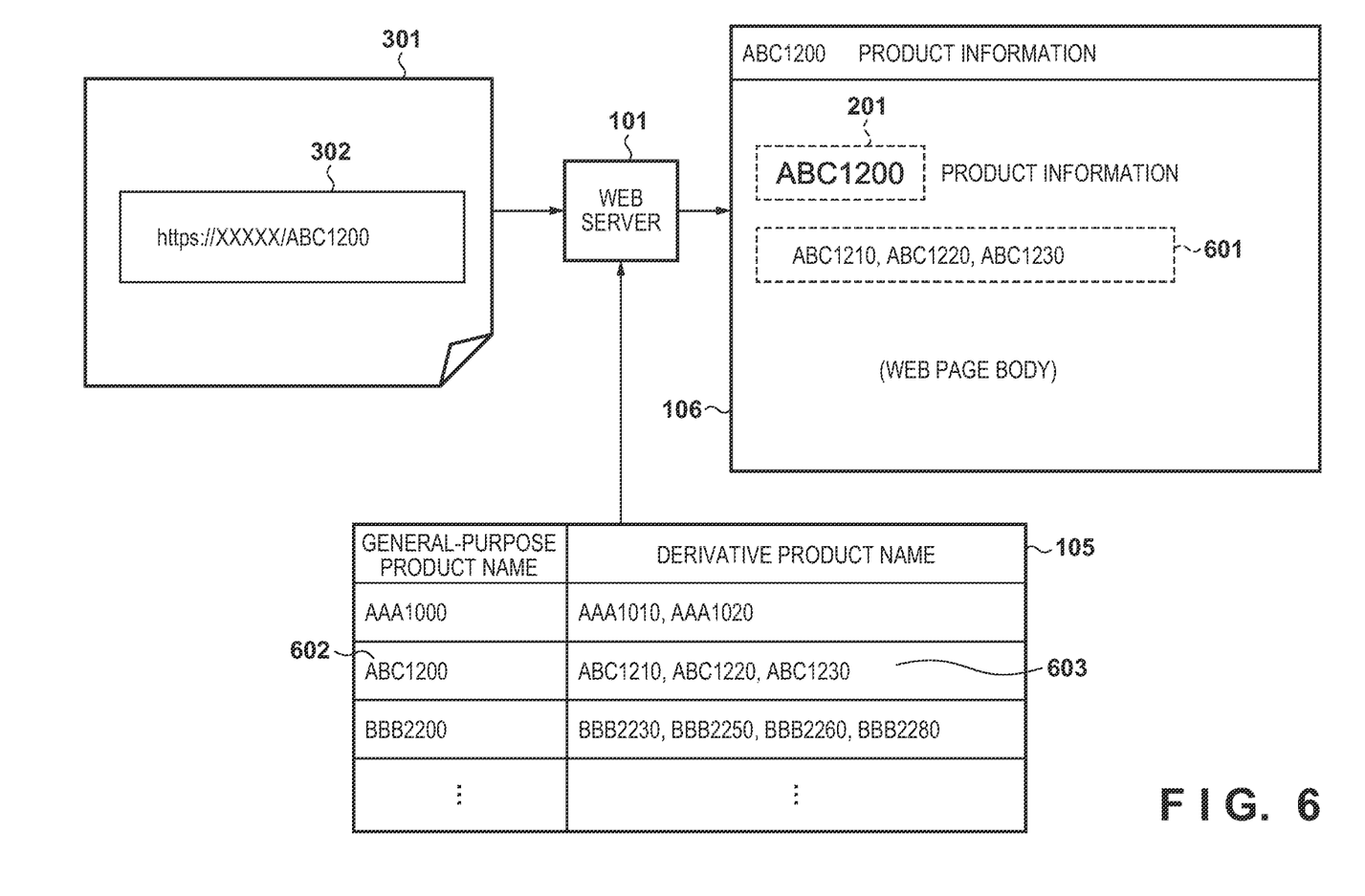
FIG. 6 is a view illustrating a generated product information Web page.

FIG. 6 is a view illustrating an example of the product information Web page 106 generated in a case where it is decided that a product name appended to the product name inclusive URL 302 is a general-purpose product name. As an example, a product name, "ABC1200", is appended to the end of the product name inclusive URL 302 of FIG. 6. In the general-purpose product name table 105, "ABC1200" is described as a general-purpose product name 602 of the general-purpose product name column 401. Also, "ABC1210, ABC1220, ABC1230" are described as derivative product names 603 of the derivative product name column 402 that corresponds to the general-purpose product name 602.

Regarding the product name display system 102, after acquisition of the product name inclusive URL 302, the general-purpose product name determination unit 103 decides that a product name appended to the product name inclusive URL 302 is a general-purpose product name based on the determination result in step S503 by the processing of FIG. 5. Then, the product name output unit 104 describes in the product information Web page 106 a general-purpose product name and one or more derivative product names by the processing in steps S504, S505, and S506. For example, as illustrated in FIG. 6, in the product name display area 201 on the product information Web page 106 to be displayed on the Web browser 109, "ABC1200", which is a general-purpose product name outputted from the general-purpose product name determination unit 103, is described.

The derivative product name display area 601 on the product information Web page 106 is an area in which one or more derivative product names that belong to the general-purpose product name outputted from the general-purpose product name determination unit 103 are displayed. The product name output unit 104 describes all of one or more derivative product names in the derivative product name display area 601. For example, as illustrated in FIG. 6, one or more derivative product names, "ABC1210, ABC1220, ABC1230", which corresponds to "ABC1200" described in the general-purpose product name 602, is described in the derivative product name display area 601. In the Web page body of the product information Web page 106 of FIG. 6, product information created in advance for "ABC1200" is read out and then described.

Figure 7:
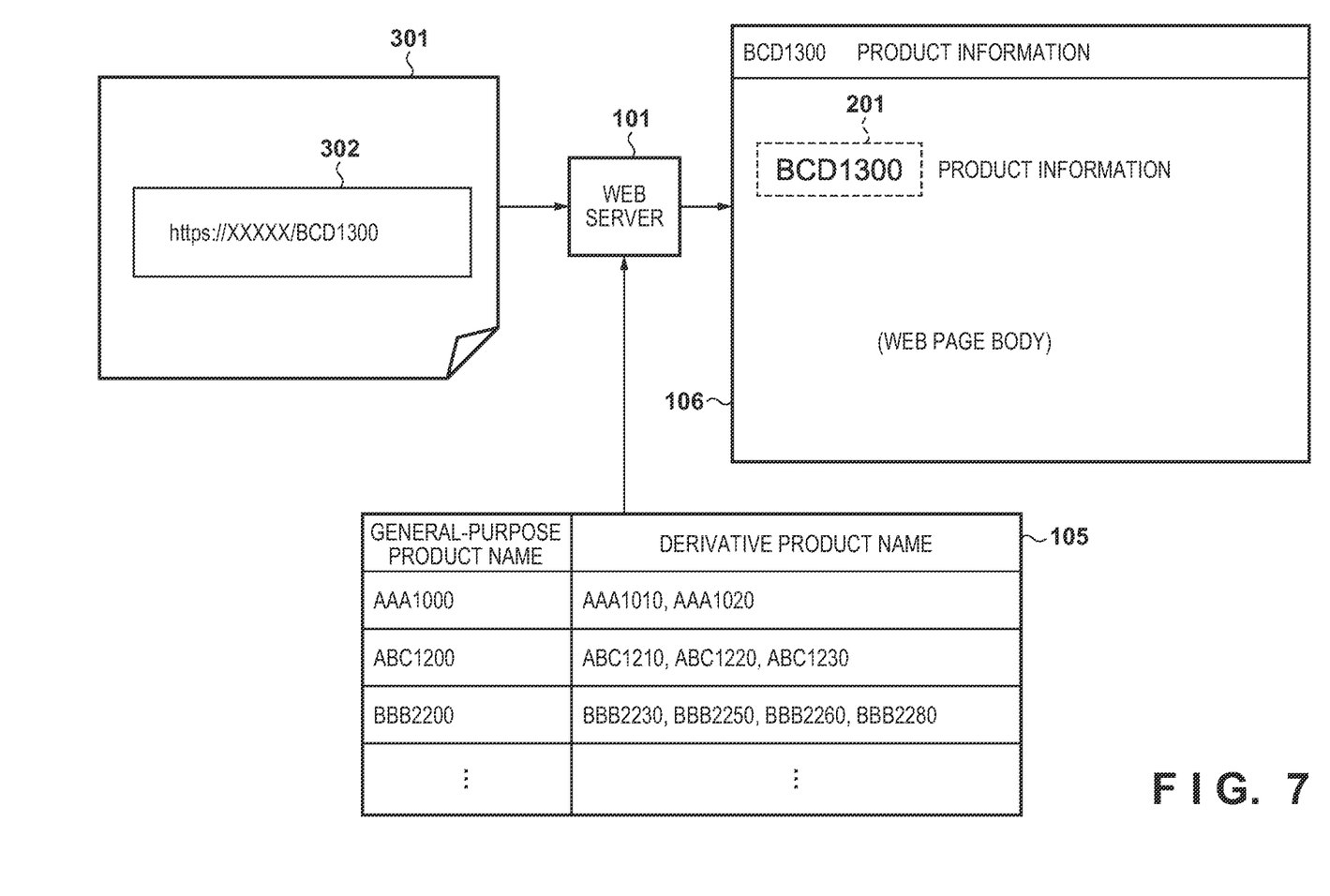
FIG. 7 is a view illustrating a generated product information Web page.

FIG. 7 is a view illustrating an example of the product information Web page 106 generated in a case where it is decided that a product name appended to the product name inclusive URL 302 is not a general-purpose product name. In FIG. 7, "BCD1300" is appended as an example to the end of a product name inclusive URL 302. Here, in the general-purpose product name column 401 of the general-purpose product name table 105, "BCD1300" is not described. In such a case, it is determined that the product name appended to the product name inclusive URL 302 is not a general-purpose product name based on the determination result in step S503 of FIG. 5. Then, the product name output unit 104 describes that product name, "BCD1300", in the product information Web page 106 in step S507. For example, as illustrated in FIG. 7, in the product name display area 201 on the product information Web page 106 to be displayed on the Web browser 109, "BCD1300", which is a product name outputted from the general-purpose product name determination unit 103, is described. Note that in the Web page body of the product information Web page 106 of FIG. 7, product information created in advance for "BCD1300" is read out and then described.

As described above, by virtue of the present embodiment, the Web server 101 generates the product information Web page 106 in which a derivative product name that belongs to a product name appended to the product name inclusive URL 302 is described. Such a configuration makes it possible for the user, regardless of which product in a series they have, to easily confirm the name and product information of the product that they have on the displayed product information Web page simply by designating a URL that includes the product name. Also, even in a case where a derivative product name that belongs to the product name does not exist, it is possible to easily confirm the name and product information of the product that they have on the displayed product information Web page simply by designating a URL that includes the product name. Also, the Web server 101 that manages the Web page will no longer have to manage the product information Web page that corresponds to each derivative product name, thereby making it possible to reduce management load. Furthermore, in a case where a derivative product name that corresponds to a general-purpose product name has been changed, it is possible for the Web server 101 to provide an appropriate product information Web page 106 simply by replacing content of a derivative product name in the general-purpose product name table.

Second Embodiment

Hereinafter, regarding the second embodiment, points that differ from the first embodiment will be described. In the first embodiment, a configuration in which the product information Web page 106 is generated by acquiring a product name from the product name inclusive URL 302 was described. In the present embodiment, a case where the user accesses the product information Web page 106 using a URL to which a product name is not appended is assumed. For example the above case can be expected in a situation in which the external medium 301 is made to be universal across all products that the product information Web page 106 targets in order for the creator of the external medium 301 to limit the pattern of the external medium 301 to be created to only one. In the present embodiment, in order to support such a case, a product-name-less URL 801, which is the product name inclusive URL 302 from which an element of a product name has been removed, is set.

Figure 8:
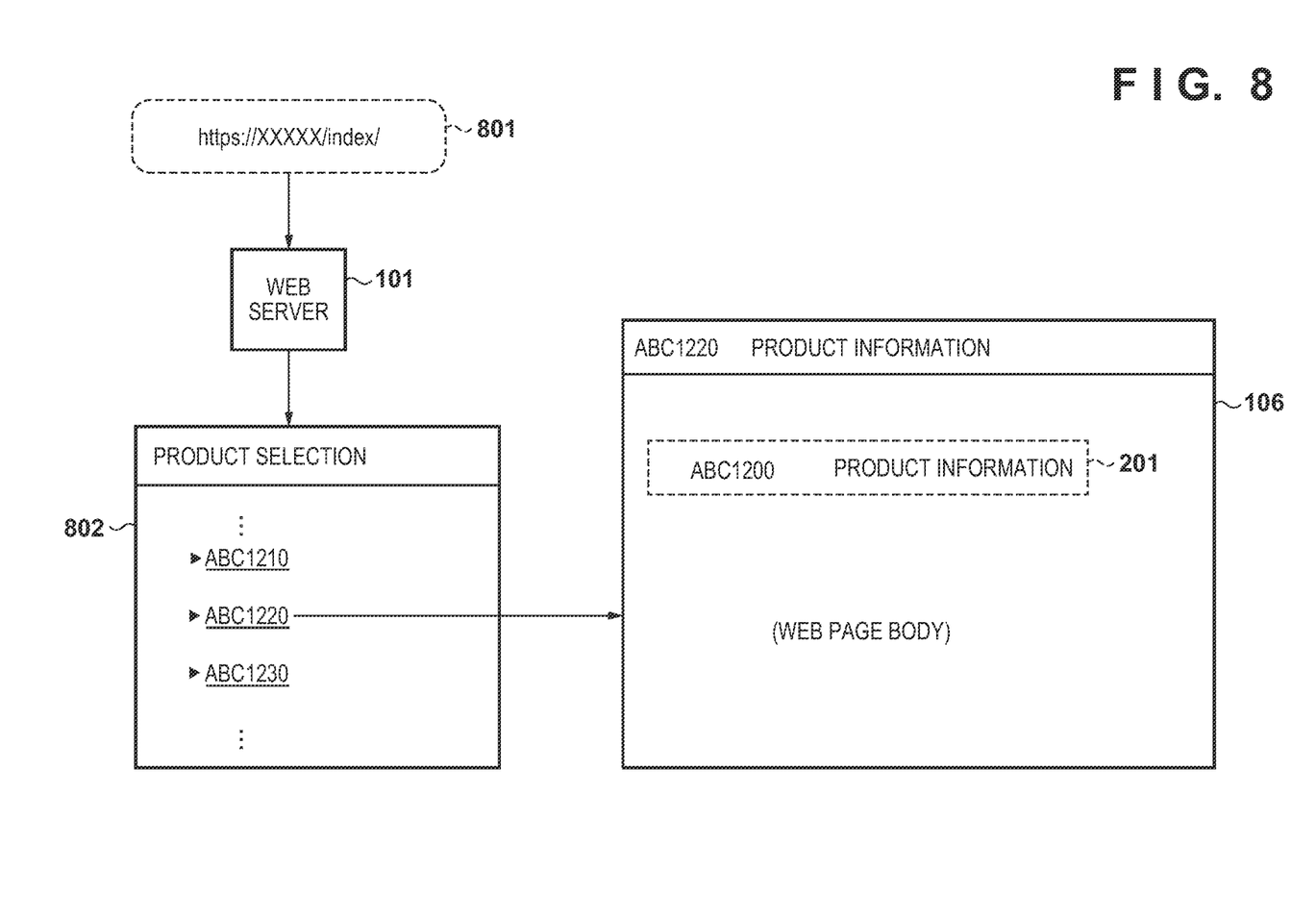
FIG. 8 is a view illustrating a generated product information Web page.

FIG. 8 is a view illustrating an example of the product information Web page 106 generated based on a product-name-less URL to which a product name is not appended.

The product-name-less URL 801, among the URLs for accessing the product information Web page 106, is a URL, in which a product name is not appended to the URL. For example, as illustrated in FIG. 8, "index" is appended to an end portion to which a product name is appended in the product name inclusive URL 302. "index" is an example of a keyword predetermined to be able to support the above case.

In the present embodiment, the general-purpose product name determination unit 103, in a case where a product name is not appended to a URL for which an access has been received, transfers information that indicates of such to the product name output unit 104. Then, the product name output unit 104 first generates a product name selection Web page 802 and transmits it to the information processing apparatus 108, which is a source from which an access to a URL has been received. Then, in the information processing apparatus 108, the product name selection Web page 802 is displayed by the Web browser 109.

The product name selection Web page 802 is a Web page in which the user can select a product name and is displayed based on the product-name-less URL 801. In the present embodiment, the product name output unit 104 generates the product name selection Web page 802 in which all or some of product names that the product information Web page 106 supports are described. For example, as illustrated in FIG. 8, a Web page in which "ABC1210", "ABC1220", and "ABC1230" are described as product names that the product information Web page 106 supports is generated. In the information processing apparatus 108, after a display of the product name selection Web page 802 by the Web browser 109, selection by the user from one or more product names is accepted. When selection is accepted, that selection result is transmitted to the Web server 101. The product name output unit 104, based on that selection result, generates the product information Web page 106 and transmits it to the information processing apparatus 108, which is a source from which an access to a URL has been received. Then, the product information Web page 106 is displayed by the Web browser 109 of the information processing apparatus 108.

Figure 11:
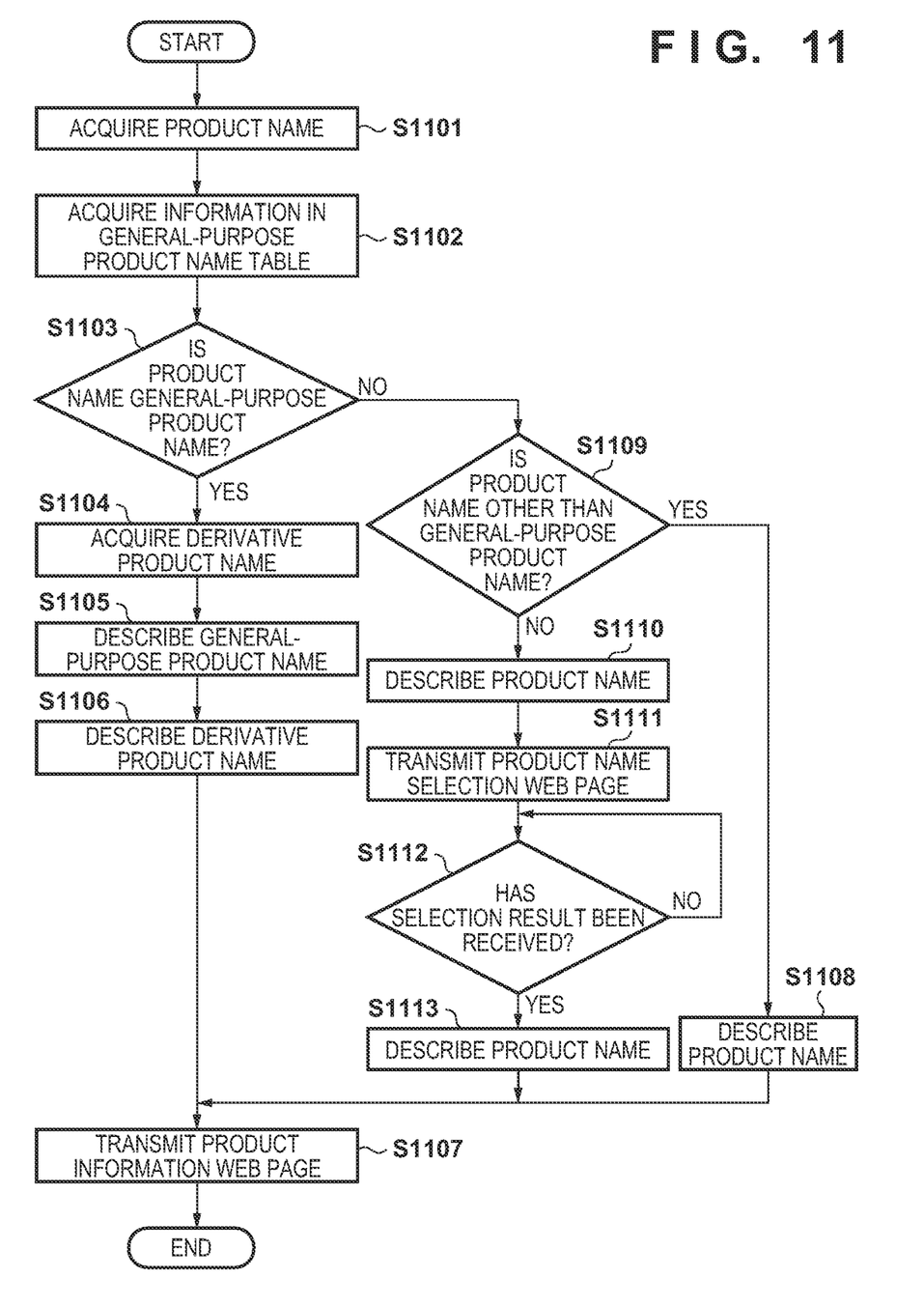
FIG. 11 is a flowchart illustrating processing of a product name display system.

FIG. 11 is a flowchart illustrating processing of the product name display system 102 in the present embodiment. The processing of FIG. 11 is realized by, for example, the CPU 1001 reading out to the RAM 1002 a program stored in the ROM 1003 and executing it. The processing in steps S1101 to S1107 of FIG. 11 is the same as the description in step S501 to S506 and S508 of FIG. 5; accordingly, description thereof will be omitted.

In the present embodiment, in a case where it is determined that the product name acquired in step S1101 is not a general-purpose product name, the processing advances from step S1103 to S1109, and the general-purpose product name determination unit 103 determines whether or not the product name acquired in step S1101 is a product name other than a general-purpose product name. More specifically, the Web server 101 is managing a derivative product name table in addition to the general-purpose product name table 105 as in FIG. 4. The derivative product name table may be, for example, a table in which a derivative product name is defined. The processing in step S1103 is performed using the general-purpose product name table 105, and the processing in step S1109 may be performed using the derivative product name table. In other words, the processing in step S1109 is realized by determining whether or not the product name acquired in step S1101 is included in the derivative product name table. Then, in a case where the product name acquired in step S1101 is included in the derivative product name table, in step S1109, it is determined that the product name acquired in step S1101 is a product name other than a general-purpose product name. In step S1109, in a case where it is determined that the product name acquired in step S1101 is a product name other than a general-purpose product name, the URL for which an access has been received is the product name inclusive URL 302. Accordingly, the general-purpose product name determination unit 103 transfers the product name appended to the predetermined position of the product name inclusive URL 302 to the product name output unit 104. Then, the product name output unit 104 acquires the product information Web page 106 and then describes the product name in the product name display area 201 (step S1108). Note that in such a case, similarly to the first embodiment, neither a general-purpose product name nor a derivative product name will be described on the generated product information Web page 106. Also, the product information Web page 106 prior to description may be generated in advance or generated in step S1108. At that time, a Web page body may be generated based on information that corresponds to a specific product name. Then, similarly to step S508 subsequent to step S507 of FIG. 5, the processing in step S1107 is performed.

Meanwhile, in a case where it is determined in step S1109 that the product name acquired in step S1101 is not a product name other than a general-purpose product name, such as in a case where a product name is not described and the like, the general-purpose product name determination unit 103 transfers a keyword appended to the predetermined position of the product-name-less URL 801 to the product name output unit 104. Then, the product name output unit 104 acquires the product name selection Web page 802 and describes in the product name selection Web page 802 all or some of product names that the product information Web page 106 supports (step S1110). For example, the product name described in the above-described derivative product name table may be described in the product name selection Web page 802. Note that the product name selection Web page 802 prior to description may be generated in advance or generated in step S1110. Also, a screen for accepting an instruction to display the product name selection Web page 802 may be displayed prior to a display of the product name selection Web page 802.

The product name output unit 104 transmits via the Internet 107 the product name selection Web page 802 generated in step S1110 to the information processing apparatus 108, which is a source from which an access to a URL has been received (step S1111). Then, in the information processing apparatus 108, the product name selection Web page 802 is displayed by the Web browser 109. Then, when a product name is selected by the user on the product name selection Web page 802, that selection result is transmitted to the Web server 101 via the Web browser 109.

In step S1112, the general-purpose product name determination unit 103 waits for reception of the selection result. When the selection result is received, the general-purpose product name determination unit 103 transfers that selection result to the product name output unit 104. Then, the product name output unit 104 acquires the product information Web page 106 and then describes the product name that the selection result indicates in the product information Web page 106 (step S1113). Also, the product information Web page 106 prior to description may be generated in advance or generated in step S1113. Note that the processing in step S1113 may be realized by, for example, reading out the product information Web page 106 that corresponds to a product name that the selection result indicates.

The product name output unit 104 transmits via the Internet 107 the product information Web page 106 generated in step S1113 to the information processing apparatus 108, which is a source from which an access to a URL has been received (step S1107). Then, in the information processing apparatus 108, the product information Web page 106 is displayed by the Web browser 109.

As described above, by virtue of the present embodiment, even in a case where a product name is not included in a URL, the user can confirm a product name that they want to view on the displayed product name selection Web page 802 simply by designating the URL thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-132540, filed Aug. 4, 2020, which is hereby incorporated by reference herein in its entirety.

What is claimed is:

1. An information processing apparatus comprising:
a memory device that stores a set of instructions and a table in which first name information which is a product name of a product and second name information which is a product name of a derivative product derived from the product are associated with each other; and
at least one processor that executes the set of instructions to:
receive an access to a URL that includes information of a product name;
determine whether or not the information of the product name included in the URL to which the access has been received is the first name information included in the stored table;
in a case where it is determined that the information of the product name included in the URL to which the access has been received is the first name information included in the stored table, generate a Web page in which the first name information which is the product name of the product and the second name information which is the product name of the derivative product and associated with the first name information are described, and transmit, to a source of the access to the URL, the generated Web page in which the first name information which is the product name of the product and the second name information which is the product name of the derivative product are described; and
in a case where it is determined that the information of the product name included in the URL to which the access has been received is not the first name information included in the stored table, generate a Web page in which the information of the product name included in the URL to which the access to has been received is described, and transmit, to the source of the access to the URL, the generated Web page in which the information of the product name included in the URL to which the access has been received is described.

2. The information processing apparatus according to claim 1, wherein,
in the case where it is determined that the information of the product name included in the URL to which the access has been received is not the first name information included in the stored table, the generated Web page is a Web page for displaying product information to be selectable.

3. The information processing apparatus according to claim 2, wherein in a case where product information is selected using the Web page for displaying product information to be selectable is received, a Web page based on the selected product information is transmitted to the source of the access to the URL.

4. The information processing apparatus according to claim 1, wherein the information of the product name is appended to an end of the URL to which the access has been received.

5. The information processing apparatus according to claim 1, wherein the first name information which is the product name of the product includes a general-purpose product name.

6. A system that includes a terminal and an information processing apparatus,
the terminal comprising:
at least one processor that executes a set of instructions to access a URL that includes information of a product name; and
the information processing apparatus comprising:
a memory device that stores a set of instructions and a table in which first name information which is a product name of a product and second name information which is a product name of a derivative product derived from the product are associated with each other; and at least one processor that executes the set of instructions to:

receive an access to a URL that includes information of a product name;

determine whether or not the information of the product name included in the URL to which the access has been received is the first name information included in the stored table;

in a case where it is determined that the information of the product name included in the URL to which the access is received is the first name information included in the stored table, generate a Web page in which the first name information which is the product name of the product and the second name information which is the product name of the derivative product and associated with the first name information are described, and transmit, to a source of the terminal apparatus that accesses to the URL, the generated Web page in which the first name information which is the product name of the product and the second name information which is the product name of the derivative product are described; and in a case where it is determined that the information of the product name included in the URL to which the access has been received is not the first name information included in the stored table, generate a Web page in which the information of the product name included in the URL to which the access to has been received is described, and transmit, to the source of the access to the URL, the generated Web page in which the information of the product name included in the URL to which the access has been received is described.

7. The system according to claim 6, wherein the URL that includes the information of the product name is described on an external medium, and the URL described on the external medium is accessed.

8. The system according to claim 7, wherein the URL that includes the information of the product name is described as a barcode on the external medium.

9. The system according to claim 8, wherein by capturing the barcode, the URL that includes the information of the product name is accessed.

10. An information processing method that is executed in an information processing apparatus, the method comprising:

storing, in a memory device, a set of instructions and a table in which first name information which is a product name of a product and second name information which is a product name of a derivative product derived from the product are associated with each other;

receiving an access to a URL that includes information of a product name;

determine whether or not the information of the product name included in the URL to which the access has been received is the first name information included in the stored table;

in a case where it is determined that the information of the product name included in the URL to which the access has been received is the first name information included in the stored table, generating a Web page in which the first name information which is the product name of the product and the second name information which is the product name of the derivative product and associated with the first name information are described, and transmitting to a source of the access to the URL, the generated Web page in which the first name information which is the product name of the product and the second name information which is the product name of the derivative product are described; and in a case where it is determined that the information of the product name included in the URL to which the access has been received is not the first name information included in the stored table, generating a Web page in which the information of the product name included in the URL to which the access to has been received is described, and transmitting, to the source of the access to the URL, the generated Web page in which the information of the product name included in the URL to which the access has been received is described.

11. A non-transitory computer-readable storage medium operable to store a program that causes a computer to function so as to:

store, in a memory device that stores a set of instructions and a table in which first name information which is a product name of a product and second name information which is a product name of a derivative product derived from the product are associated with each other;

receive an access to a URL that includes information of a product name;

in a case where it is determined that the information of the product name included in the URL to which the access has been received is the first name information included in the stored table, generate a Web page in which the first name information which is the product name of the product and the second name information which is the product name of the derivative product and associated with the first name information are described, and transmitting to a source of the access to the URL, the generated Web page in which the first name information which is the product name of the product and the second name information which is the product name of the derivative product are described; and in a case where it is determined that the information of the product name included in the URL to which the access has been received is not the first name information included in the stored table, generating a Web page in which the information of the product name included in the URL to which the access to has been received is described, and transmitting, to the source of the access to the URL, the generated Web page in which the information of the product name included in the URL to which the access has been received is described.

* * * * *